United States Patent [19]

Bushell et al.

[11] Patent Number: 4,829,407

[45] Date of Patent: May 9, 1989

[54] INDICATOR LAMPS

[75] Inventors: Timothy G. Bushell, Ulverston; Geoffrey S. Edwards, Allithwaite, both of England

[73] Assignee: Oxley Developments Company Limited, London, England

[21] Appl. No.: 118,151

[22] Filed: Nov. 6, 1987

[51] Int. Cl.$^4$ .......................... G01D 11/28; F21Y 9/06

[52] U.S. Cl. ...................................... 362/29; 362/768; 362/293; 362/331; 362/800

[58] Field of Search .................. 362/23, 29, 268, 293, 362/800, 62, 331

[56] References Cited

U.S. PATENT DOCUMENTS

| | | | |
|---|---|---|---|
| 4,495,549 | 1/1985 | Carlson et al. | 362/293 X |
| 4,580,196 | 4/1986 | Task | 362/62 |
| 4,712,163 | 12/1987 | Oxley | 362/29 |

*Primary Examiner*—Ira S. Lazarus
*Assistant Examiner*—Richard R. Cole
*Attorney, Agent, or Firm*—Tilton, Fallon, Lungmus & Chestnut

[57] ABSTRACT

An indicator lamp comprising a tubular housing which is closed at one end and has a light source disposed within it at a position remote from its open end. A diffusing screen is disposed within the tubular housing in front of the light source and again remote from the open end of the housing. The internal surfaces of the tubular housing between the location of the light source and the open end of the housing are blackened. A transparent lens is disposed adjacent the open end of the tubular housing and carries on its side closest to the light source an infra-red suppressing filter, and, on its side remote from the light source, an anti-reflection coating.

1 Claim, 1 Drawing Sheet

INDICATOR LAMPS

DESCRIPTION

Figure 2:
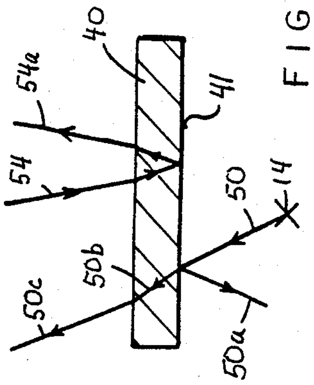

The invention relates to indicator lamps.

Indicator lamps, when in operation, emit visible light but most such devices also emit a near infra-red component. This is an inherent feature of known devices. Ideally, for some applications, an indicator lamp of this sort would have a high energy output of visible light, and no output in the near infra-red spectral region.

The need for such an indicator lamp has been brought about by the increasing use of sensitive night viewing apparata which are designed to enable the user to view objects in dark light. Such apparata are able to detect the low levels of near infra-red radiation emitted or reflected by these objects and are, thus, able to "see" in the dark. Commonly, night viewing apparata are sensitive within the spectral region 600 to 900 nanometers, the red/near infra-red region.

Indicator lamps used to proximity to night viewing apparata and on most other electronic equipment, commonly use light emitting diodes. L.E.D.'s have a relatively narrow spectral output, in the region of 40 nanometers, but inherently, also emit energy in the near infra-red region. The levels of near infra-red energy emitted are generally sufficient to "blind" the night viewing apparata. This is because the L.E.D.'s can flood the night viewing apparata with a much higher level of near infra-red energy than can the objects which are being observed by the apparata.

It can also be important to restrict near infra-red emissions from indicators so as to prevent detection by night viewing apparata used remote from the equipment.

Whilst it is obviously important to reduce the near infra-red radiation from the lamp to a minimum, it is also important to maintain the visible energy output of the indicator lamp at as high a level as possible.

It is an object of the present invention to mitigate the above problems by providing an indicator lamp whose emission is substantially free from radiation in the near infra-red spectral region while still providing a high level of visible light.

An indicator lamp in accordance with the present invention comprises a tubular housing having an open end and a closed end. A light source is disposed within the tubular housing at a position remote from said open end thereof. A diffusing screen for providing even illumination over the viewing area is disposed deep within the tubular housing in front of said light source and remote from said open end of said tubular housing means whereby to restrict lamp emission angle. The internal surface of the tubular housing between the position of the light source and the open end is blackened in order to eliminate spurious internal reflection which would otherwise increase emission angle. A transparent lens is disposed adjacent the open end of the tubular housing and in a plane perpendicular to the longitudinal axis of the tubular housing. The side of the lens closest to the light source carries an infra-red suppression filter and the side of the lens remote from the light source carries an anti-reflection coating.

Figure 1:
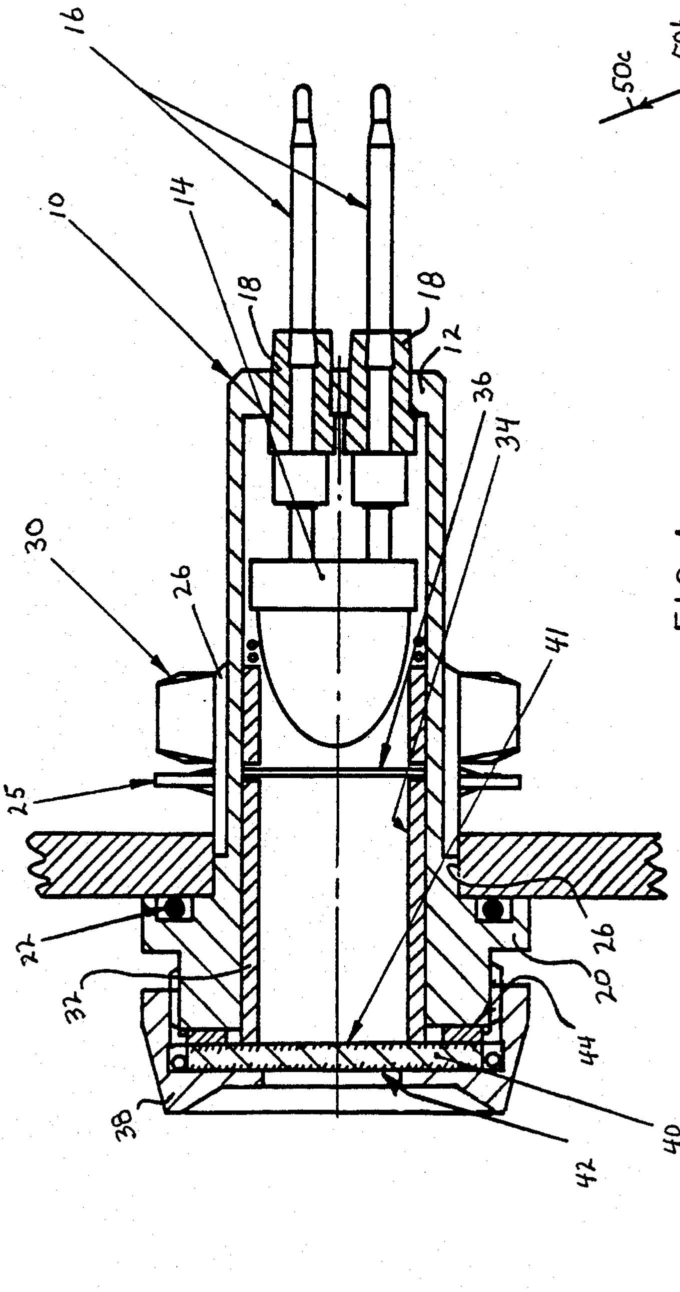

The invention will now be described further hereinafter, by way of example only, with reference to the accompanying drawings, in which:

FIG. 1 is a schematic diagram of one embodiment of an indicator lamp in accordance with the present invention; and FIG. 2 is a sectional view through a glass lens, illustrating the operation of the embodiment of FIG. 1.

The illustrated indicator lamp comprises a generally tubular housing 10 which is closed at one end by a transverse wall 12. Disposed within the tubular housing 10 is a coloured LED 14 whose rear terminations 16 pass through the rear wall 12 via respective electrically non-conductive bushes 18. Preferably the bushes are mounted in the housing wall 12 by means of the Oxley cone-lock technique described in our prior U.S. Pat. No 2,911,460 to which reference is hereby directed. The housing 10 can be made of a metallic material, such as an aluminium alloy.

The housing 10 is formed adjacent its open end with a peripheral flange 20, containing a silicone rubber O-ring seal 22 in its rearward facing surface, for engaging the front surface of a panel 24 when the lamp is mounted in its operational position within a panel aperture 26. In a conventional manner, the housing 10 also includes an external screw-threaded portion 26 for receiving a beryllium copper washer 28 and lock-nut 30. The washer 28 is preferably tin-finished for electrochemical compatibility with aluminium parts with which it comes into contact. The nut 30 is preferably aluminium alloy, chromate covered for environmental protection.

Mounted within the tubular housing in front of the LED 14 is a two-part tubular member 32 whose inner cylindrical surface 34 is blackened in order to eliminate spurious internal reflection which would increase emission angle. By way of example, the tube surface 34 may be matt black anodised. Between the two parts of the tube 32, there is mounted a disc-shaped diffusing screen 36 which acts to provide even illumination over the viewing area. The screen is arranged to be positioned relatively deep into the housing body bore in order to restrict the lamp emission angle.

Mounted on the front of the lamp housing 10, by means of a screw-threaded shroud 38 is a lens 40 of neutral density glass whose transmission rate is preferably chosen to be less than about 40% in order to create a tunnel as "black hole" effect to quench incident sunlight and provide sunlight readability. The rear surface of the glass lens carries an infra-red (IR) suppressing filter 41 to reduce IR emission. The front surface of the lens 40 carries an anti-reflection coating 42 to prevent spurious reflections from the glass lens. The shroud 38 is preferably of matt black anodised aluminium for high ON/OFF contrast ratio and good sunlight readability, the shroud being secured in its operational position by means of a thread-locking compound. Disposed between the glass lens 40 and the open end of the body 10 is a compliant sealing ring 44, rending the interior of the body watertight. Preferably, the sealing ring 44 is of fluorocarbon rubber.

Whereas the filter 41 serves to filter out the undesirable infra-red energy it also, disadvantageously, tends to attenuate the visible light output. In order to reduce the latter attenuation to a minimum, it is preferred to use a thin-film interference filter as the infra-red filter 41. This allows a very rapid transition from transmission in the visible region to rejection in the infra-red region. Although the interference filter is shown fabricated on a glass substrate 40, it is possible to use other substrates such as sapphire.

A characteristic of the thin-film interference filter used for IR suppression is that it is highly reflective in the red or orange/red spectra region, particularly if the infra-red blocking is required to begin in the 600 to 650 nanometers region. Such a filter, if it were used alone in the indicator lamp could give spurious "on" indication if the lamp were to be used in bright sunlight. For this reason the glass lens 40 is used to reduce the level of reflection from the infra-red blocking filter 41.

The operation of the arrangement shown in FIG. 1 is illustrated diagrammatically in FIG. 2, to which reference is now made.

Reference numeral 50 indicates light incident on the IR filter 41 from the LED Light source 14. A portion 50*a* of this light, corresponding to the unwanted IR, is reflected by the IR filter 41 back towards the general direction of the light source 14. The remaining portion 50*b*, corresponding to the required visible light, is passed by the IR filter 41. However, it undergoes a certain amount of attenuation in the glass lens 40 before emerging as visible light 50*c*.

On the other hand, ambient illumination 54 incident on the front face of the lens 40 enters the filter 12, undergoes attenuation by the glass lens, is reflected by the IR filter, undergoes further attenuation by the glass lens and emerges again as indicated at 54*a*. However, due to the low transmission ratio of the lens glass, the proportion of the energy in the original incident beam 54 which emerges at 54*a* is very small.

It is important to ensure that all the energy emitted from the light source 14 is either incident upon the infra-red blocking filter 36, or otherwise prevented from being emitted from the lamp. L.E.D.'s are particularly suited for this as the light emitting surface area is relatively small and it is, therefore, relatively easy to ensure that all the emitted energy passes through the infra-red blocking filter. In the case of multi-layer interference infra-red blocking filters, the reflection characteristics are optimised by having the light source incident normally to the filter. Thus, it is important that IR from the LED is collimated (by the blackened tube 32) to provide as near normal incidence as possible to the filter 41. The more off-axis the incidence, the more the cut-off tends to the short wavelength which thus, undesirably, increases attenuation of the visible emission.

In order to eliminate the danger of emission of unfiltered light, all L.E.D. surfaces from which emission could occur and not pass through the IR blocking filter are preferably blackened.

All other internal surfaces of the indicator which do not emit filtered light are blackened to reduce further the chance of spurious 'on' indications occurring in bright light conditions.

Although in the preferred embodiments an L.E.D. is used as the light source, other sources such as incandescent bulbs can be used. Also, although neutral density glass lenses are used, it is possible to use other materials such as sapphire and fused silica.

Thus, the effect of the described construction is to provide a tunnel effect to the indication, so as to minimise spurious side indication to the viewer, whilst providing suppression of near IR, with no bright spots and with sunlight readability.

We claim:

1. An indicator lamp comprising:

(a) tubular housing means having an open end and a closed end;

(b) an LED light source disposed within said tubular housing means at a position remote from said open end thereof;

(c) diffusing screen means disposed within said tubular housing immediately in front of said light source and remote from said open end of said tubular housing means so as to restrict the lamp emission angle;

(d) a transparent lens of neutral density glass disposed in front of said open end of the tubular housing means and in a plane perpendicular to the longitudinal axis of the tubular housing means;

(e) an infra-red suppressing, thin film interference filter formed on the side of said lens means closest to said light source;

(f) the internal surface of said tubular housing means between the position of said light source and said open end being blackened in order to eliminate spurious internal reflection and to collimate the light emitted by the light source such that it is incident substantially normally at the infra-red filter; and (g) the lens having a transmission ratio which is less than 40% in order to attenuate ambient light which enters the front of the lens and is reflected out again by the infra-red light.

* * * * *